United States Patent
Chaudhuri et al.

(10) Patent No.: US 10,701,593 B2
(45) Date of Patent: Jun. 30, 2020

(54) METHOD AND SYSTEMS FOR PERFORMING ORCHESTRATION OF SERVICES IN A NEXT GENERATION MOBILE CORE NETWORK

(71) Applicant: Wipro Limited, Bangalore (IN)

(72) Inventors: Saptarshi Chaudhuri, Kolkata (IN); Shyam Sundar Pal, Kolkata (IN)

(73) Assignee: Wipro Limited, Bangalore (IN)

( * ) Notice: Subject to any disclaimer, the term of this patent is extended or adjusted under 35 U.S.C. 154(b) by 197 days.

(21) Appl. No.: 15/937,473

(22) Filed: Mar. 27, 2018

(65) Prior Publication Data
US 2019/0306755 A1  Oct. 3, 2019

(30) Foreign Application Priority Data
Mar. 27, 2018 (IN) .............................. 201841011303

(51) Int. Cl.
*H04W 28/24* (2009.01)
*H04W 12/06* (2009.01)
(Continued)

(52) U.S. Cl.
CPC ........... *H04W 28/24* (2013.01); *H04W 12/06* (2013.01); *H04W 84/042* (2013.01); *H04W 88/14* (2013.01)

(58) Field of Classification Search
CPC ......... H04W 28/0215; H04W 28/0268; H04W 72/04; H04W 72/048; H04W 72/0493; H04W 72/10; H04W 76/11; H04W 24/02; H04W 48/18; H04W 72/08; H04W 76/27; H04W 28/08; H04W 4/50; H04W 88/08;
(Continued)

(56) References Cited

U.S. PATENT DOCUMENTS 8,584,128 B1 * 11/2013 Don ...................... G06F 9/5011
718/100
9,344,862 B2 * 5/2016 Sung ...................... H04W 4/12
(Continued)

FOREIGN PATENT DOCUMENTS

WO       2016/102297 A1    6/2016

OTHER PUBLICATIONS

Fagbohun, "Comparative Studies on 3G, 4G, and 5G Wireless Technology," IOSR Journal of Electronics and Communication Engineering 9(3):88-94 (2014), Retrieved from the Internet: <http://iosrjournals.org/iosr-jece/papers/Vol.%209%20Issue%203/Version-1/O09318894.pdf>.
(Continued)

*Primary Examiner* — Sargon N Nano
(74) *Attorney, Agent, or Firm* — Finnegan, Henderson, Farabow, Garrett & Dunner, LLP

(57) ABSTRACT

A method and system for performing orchestration of services in a next generation mobile core (NGxC) is disclosed. The method includes receiving a request from a user for accessing a service from a plurality of services supported by the NGxC network. Upon receipt of the request, the method includes determining at least a type of requested service and a feasibility of delivering the requested service at least based on an entitlement of the user and a capability of a network node for delivering the requested service. The method further includes performing an orchestration of services and one or more resources of the NGxC network for delivering the requested service, based on the determined feasibility.

15 Claims, 5 Drawing Sheets

Method 300 for performing orchestration of services in the NGxC network

(51) Int. Cl.
*H04W 88/14* (2009.01)
*H04W 84/04* (2009.01)

(58) Field of Classification Search
CPC ..... H04W 48/02; H04W 24/08; H04W 48/08; H04W 36/0022; H04W 36/08; H04W 72/005; H04W 88/02; H04W 60/06; H04W 28/24; H04W 84/042; H04W 12/06; H04W 72/044; H04W 72/00; H04W 36/0069; H04L 41/0896; H04L 41/5035; H04L 43/08; H04L 12/1407; H04L 41/5003; H04L 43/00; H04L 43/16; H04M 15/8016; H04M 15/66
See application file for complete search history.

(56) References Cited

U.S. PATENT DOCUMENTS

| | | | |
|---|---|---|---|
| 2006/0039538 A1* | 2/2006 | Minnis | H04B 17/3912 379/1.01 |
| 2008/0113679 A1* | 5/2008 | Sung | H04L 51/066 455/466 |
| 2008/0130660 A1* | 6/2008 | Ros-Giralt | H04L 47/10 370/400 |
| 2010/0216436 A1* | 8/2010 | Wijayanathan | H04W 52/0232 455/414.1 |
| 2011/0103374 A1 | 5/2011 | Lajoie et al. | |
| 2012/0076027 A1* | 3/2012 | Akyildiz | H04L 41/5025 370/252 |
| 2014/0317261 A1 | 10/2014 | Shatzkamer et al. | |
| 2015/0098393 A1* | 4/2015 | Tofighbakhsh | H04W 24/02 370/329 |
| 2016/0088671 A1* | 3/2016 | Bergstrom | H04W 76/16 370/338 |
| 2016/0205545 A1 | 7/2016 | Rink et al. | |
| 2016/0242110 A1 | 8/2016 | Kant | |
| 2019/0123978 A1* | 4/2019 | Shaw | H04L 67/1004 |
| 2019/0238425 A1* | 8/2019 | Mladin | H04L 41/0806 |
| 2019/0313473 A1* | 10/2019 | Kim | H04W 48/16 |

OTHER PUBLICATIONS

Manzalini et al., "Towards 5G Software-Defined Ecosystems: Technical Challenges, Business Sustainability and Policy", Jul. 2016, 17 pages, IEEE.

\* cited by examiner

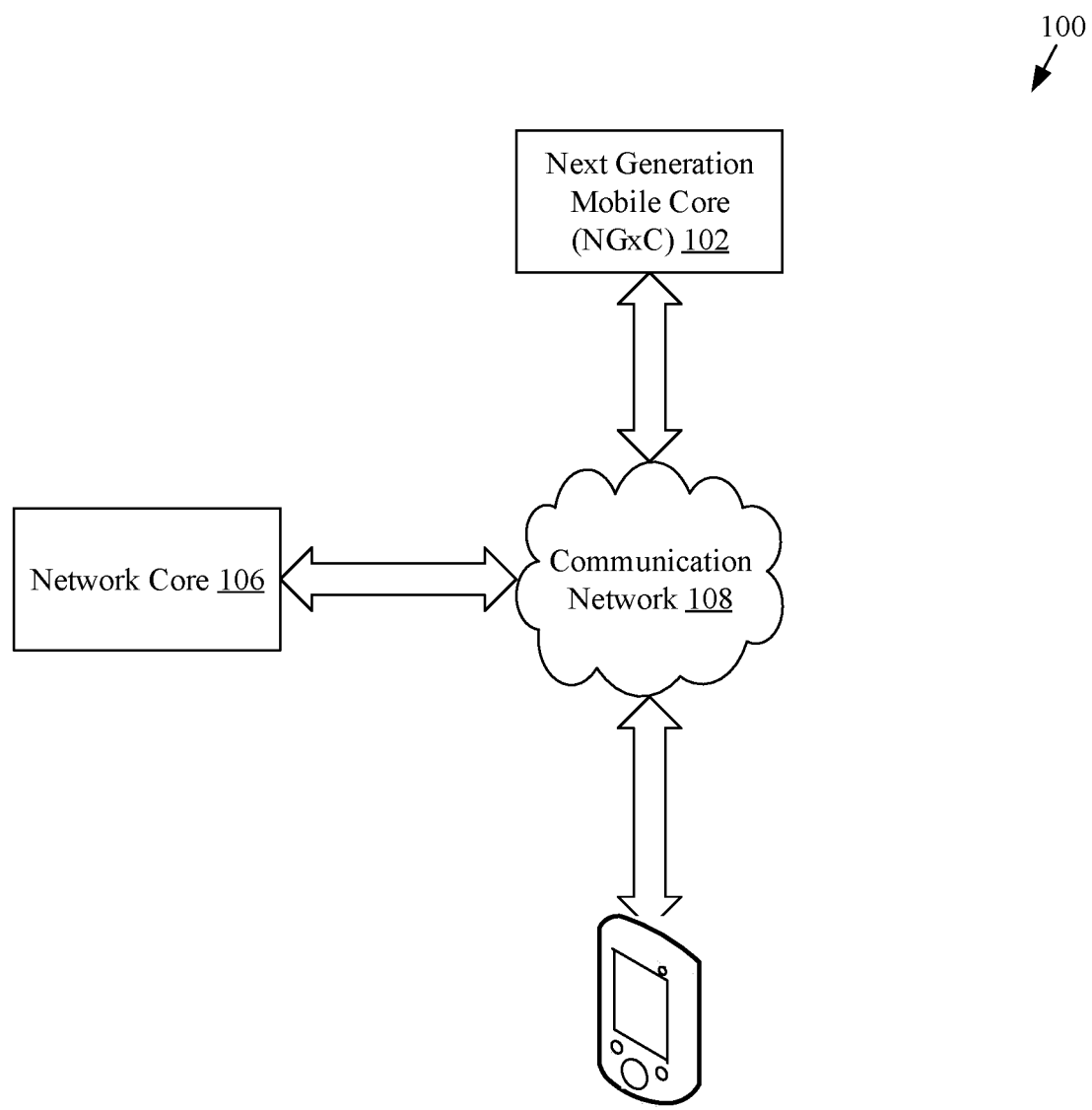
FIG. 1: Network Environment 100

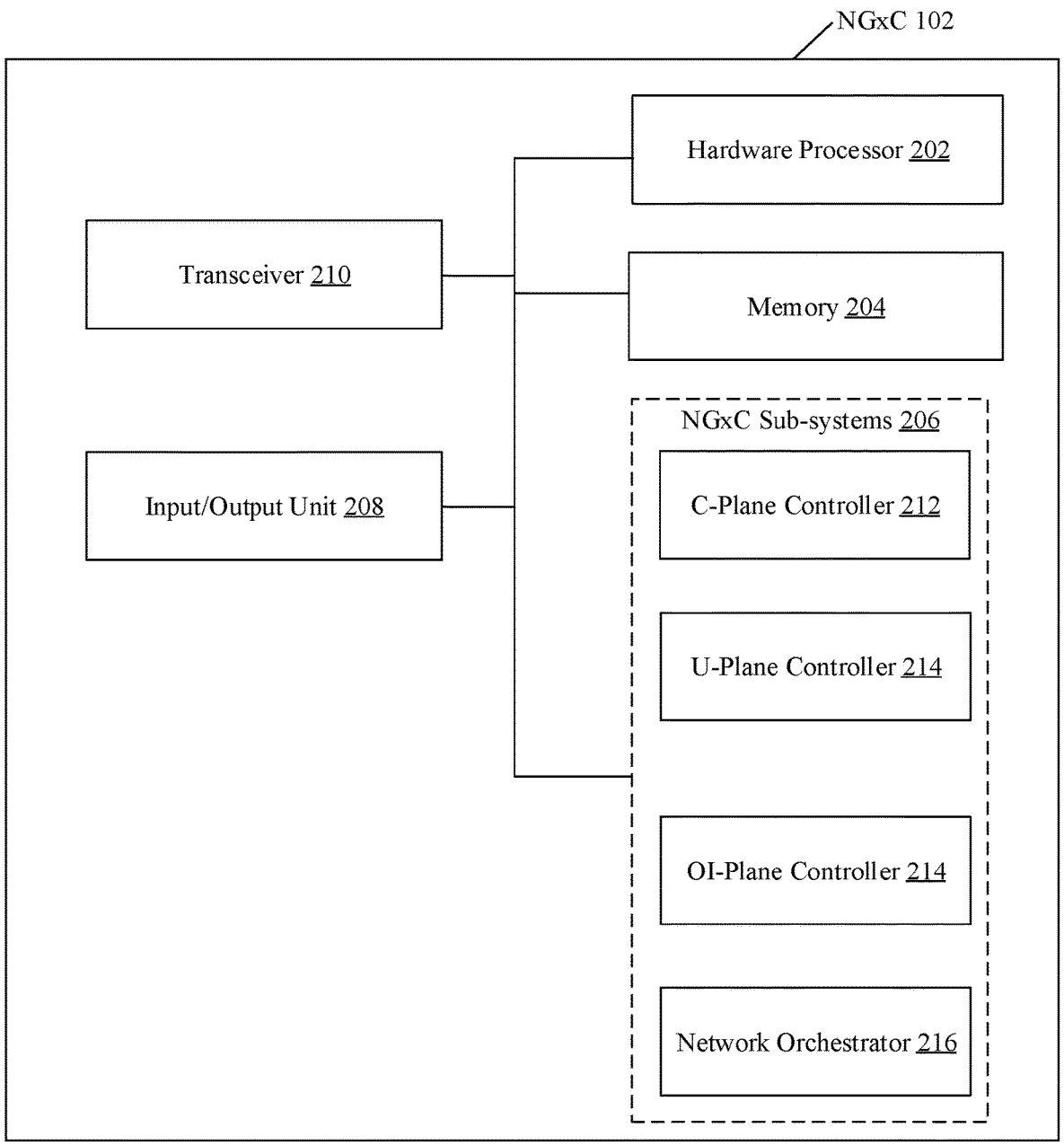
FIG. 2: Next Generation Mobile Core (NGxC) 102

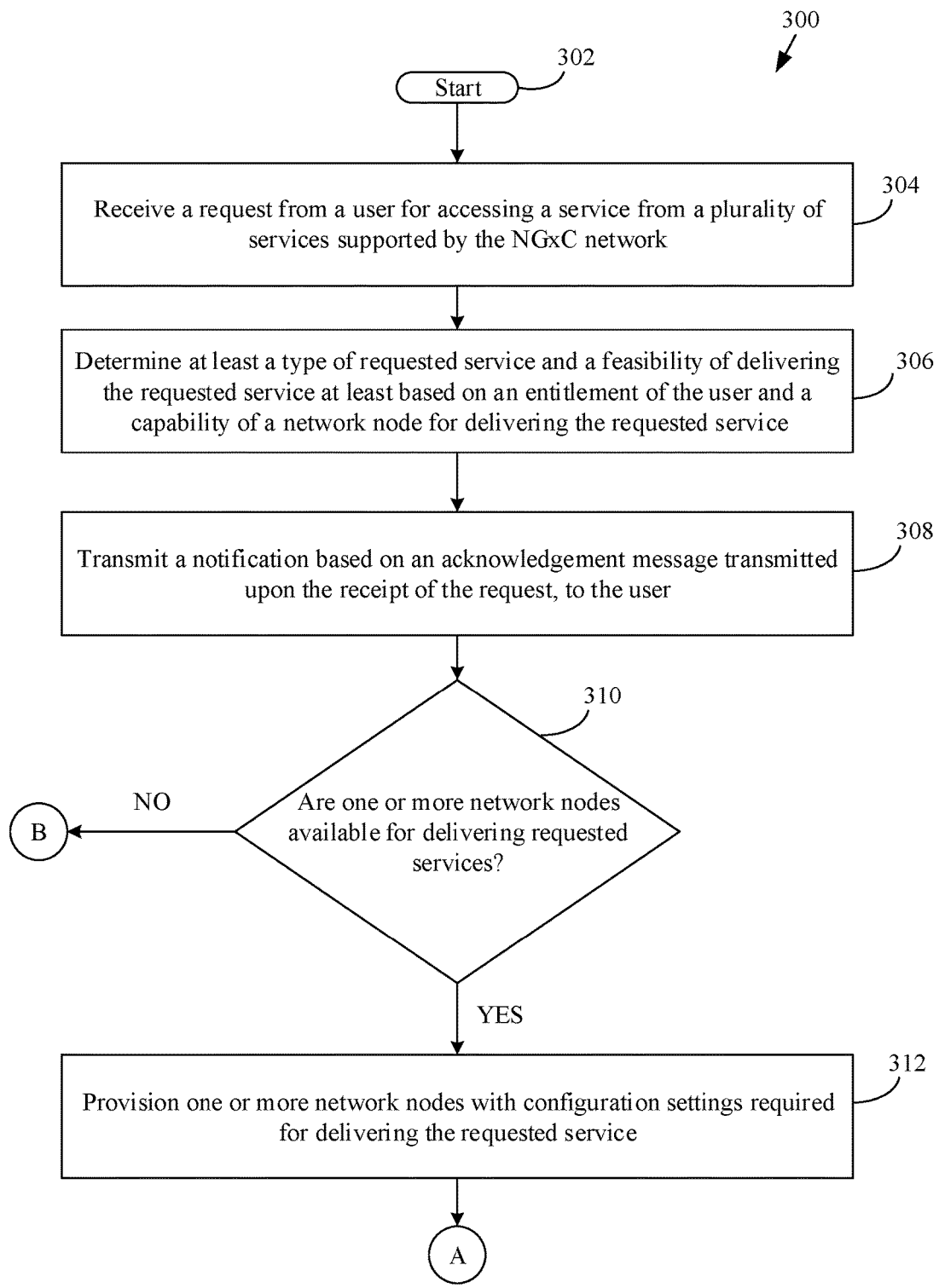
FIG. 3A: Method 300 for performing orchestration of services in the NGxC network

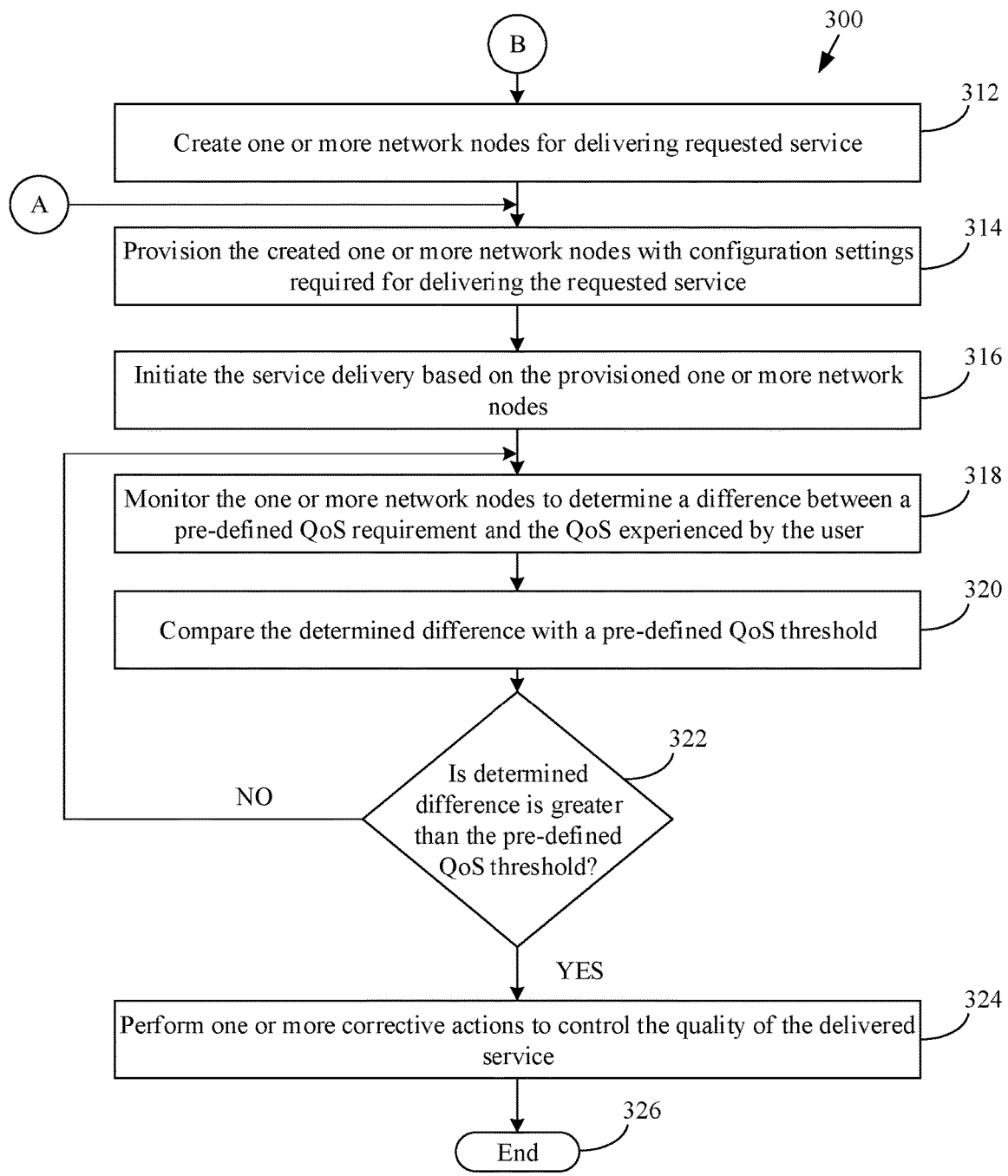
FIG. 3B: Method 300 for performing orchestration of services in the NGxC network

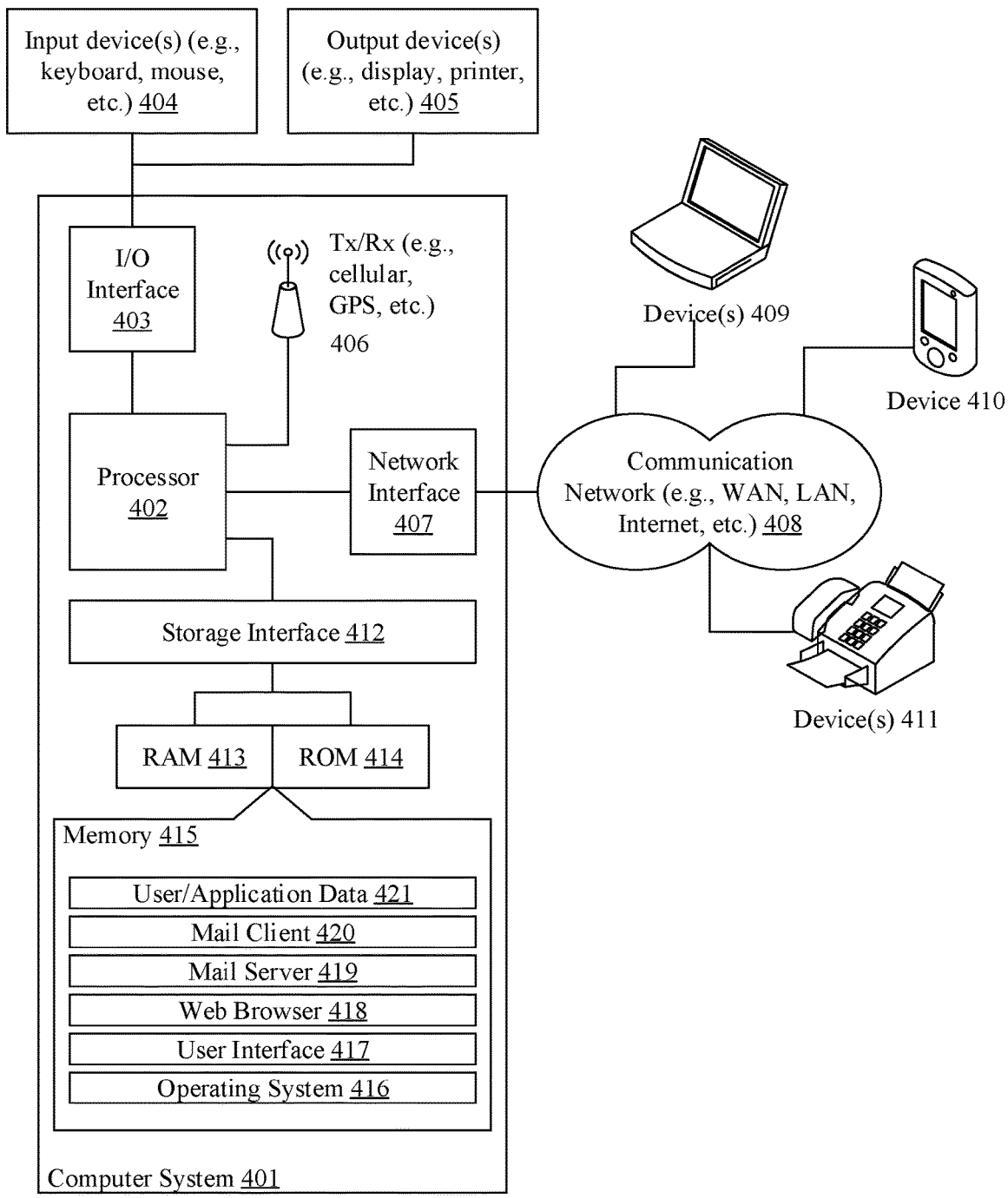
FIG. 4: Example Computer System

METHOD AND SYSTEMS FOR PERFORMING ORCHESTRATION OF SERVICES IN A NEXT GENERATION MOBILE CORE NETWORK

This application claims the benefit of Indian Patent Application Serial No. 201841011303, filed Mar. 27, 2018, which is hereby incorporated by reference in its entirety.

FIELD

This disclosure relates generally to wireless communication networks, and more particularly to methods and systems for providing a next generation mobile core architecture in wireless communication networks.

BACKGROUND

Traditionally, in a typical mobile packet core network, service-related functions are dependent on limited underlying bandwidth, Quality of Service (QoS), network coverage. Such a dependency may impact a service scalability and availability for users with different service requirements.

With the ever increasing rise in network traffic, and the advent of technologies like Internet of Things (IoT), the limitations of the existing wireless communication networks, such as Fourth-Generation Long Term Evolution (4G LTE) have been exposed. For instance, the sharp rise in the number of devices using the services supported by the core networks of 4G LTE, the bandwidth requirements have risen proportionally. Consequently, because of the limited bandwidth available with such networks, the network congestion has increased and will worsen as more and more devices get connected under IoT. Further, due to sharing of the network bandwidth between an increased number of devices has led to reduced network throughput.

Additionally, the prescribed latency for connection and reconnection in Radio Access Network (RAN) of the current 4G LTE architecture is about 100 ms which is higher compared to the latency requirements for interactive devices and applications. With the increase in connected devices because of IoT, and increased user demand for higher data rate, 4G LTE and its ability to provide fast, highly responsive mobile data services, and a reduced latency will become more important. However, because 4G LTE network is based on Packet-Switched (PS) core network and it lacks native support for Circuit-Switched (CS), the minimum latency is high in such networks and are not suited for providing voice services and time-critical services that may be required by the IoT devices.

Further, due to increased number and diverse nature of IoT devices, number of service to be supported by the core network and the nature of such services will have to be adapted. At the same time, there is a need for a core network that manages the network resources for providing such diverse services optimally, and at the same time provides a guarantee of service while ensuring that the Quality of Service (QoS) parameters of available bandwidth, throughput, network latency, and the like, are enhanced proportionally to support the increased number of connected devices.

SUMMARY

In one embodiment, a method of performing orchestration of services in a next generation mobile core (NGxC) is disclosed. The method includes receiving a request from a user for accessing a service from a plurality of services supported by the NGxC network. Upon receipt of the request, the method includes determining at least a type of requested service and a feasibility of delivering the requested service at least based on an entitlement of the user and a capability of a network node for delivering the requested service. The method further includes performing an orchestration of services and one or more resources of the NGxC network for delivering the requested service, based on the determined feasibility.

In another embodiment, a system for performing orchestration of services in a next generation mobile core (NGxC) network is disclosed. The system includes a hardware processor and a memory communicatively coupled to the hardware processor. The memory stores hardware processor executable instructions, which on execution, cause the hardware processor to receive a request from a user for accessing a service from a plurality of services supported by the NGxC network. Upon the receipt of the request, the processor-executable instructions, on execution, further cause the hardware processor to determine at least a type of requested service and a feasibility of delivering the requested service at least based on an entitlement of the user and a capability of a network node for delivering the requested service. The hardware processor may be further configured to perform an orchestration of services and one or more resources of the NGxC network for delivering the requested service, based on the determined feasibility.

In yet another embodiment, a non-transitory computer-readable medium storing computer-executable instructions for performing orchestration of services in a next generation mobile core (NGxC) network is disclosed. In one example, the stored instructions, when executed by a processor, cause the processor to perform operations that include receiving a request from a user for accessing a service from a plurality of services supported by the NGxC network. The operations further include determining upon receipt of the request, at least a type of requested service and a feasibility of delivering the requested service at least based on an entitlement of the user and a capability of a network node for delivering the requested service. The operations further include performing an orchestration of services and one or more resources of the NGxC network for delivering the requested service, based on the determined feasibility.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 is a block diagram of an exemplary network environment for performing orchestration of services in a next generation mobile core (NGxC) network, in accordance with some embodiments of the present disclosure.

FIG. 2 is a block diagram of exemplary system for performing orchestration of services in the NGxC network, in accordance with some embodiments of the present disclosure.

FIGS. 3A and 3B collectively depict flow diagram of a detailed exemplary process for performing orchestration of services in the NGxC network, in accordance with some embodiments of the present disclosure.

FIG. 4 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Additional illustrative embodiments are listed below. In one embodiment, an exemplary wireless communication network 100 for performing orchestration of services in which various embodiments may function is illustrated in FIG. 1. In an implementation, the wireless communication network 100 may include an advanced Long Term Evolution (LTE) core network that may correspond to a Fifth Generation (5G) core network or an advanced Long Term Evolution (LTE) core network. The NGxC 102 may be communicatively coupled with a user equipment 104, a Network Core (NC) 106, via the communication network 108.

It will be apparent to a person skilled in the art that the NC 106 may correspond to a core network of any of the legacy wireless communication technologies, such as Third Generation network (3G), Fourth Generation network (4G), Fourth Generation Long Term Evolution network 4G LTE, and the like. It will be apparent to a person skilled in the art that the number of UEs associated with NGxC 102 is not limited to those depicted in FIG. 1. Examples of a UE 104 may include but are not limited to a cell phone, a smart phone, a tablet, a phablet, and a laptop. In an implementation, examples of UE 104 may further include one or more devices configured as a part of Internet of Things (IoT). Such devices may include, but are not limited to, vehicles, home appliances, electronic sensors, actuators, and the like.

In an implementation, the communication network 108 may correspond to interfaces for exchange of user-plane (U-plane), control-plane (C-plane), and/or operation interface (OI) messages between the aforementioned network entities of NGxC 102, the UE 104, and the NC 106. The U-plane interface capability of the communication network 108 facilitates communication between core network (NGxC 102) and the UE 104, for user data transmission. The U-plane interface capability of the communication network 108 may be based on User Datagram Protocol (UDP) to communicate between network entities. The C-plane interface capability of the communication network 108 facilitates communication between the core network (NGxC 102) and the UE 104 for control data transmission. The operation interface capability of the communication network 108 may be based on Transfer Control Protocol (TCP) to communicate between the core network (NGxC 102) and the other network (NC 104), such as 2G, 3G, 4G, and the like. The O-plane interface capability of the communication network 108 may be based on User Datagram Protocol (UDP) to communicate between network entities.

In an implementation, the interface between the NGxC 102 and the NC 106 may be standardized based on Open flow specification (OpenFlow® Switch Specification Version 1.5.0 (Protocol version 0x06)) with which access agnostic nature of the interface can be achieved, wherein based on the access agnostic nature, necessary configuration parameters for data forwarder elements like Quality of Service (QoS), security may be provisioned. As all the devices and network nodes included in the NGxC 102 and the NC 106 are to be considered as data forwarder elements, this interface will provide the necessary information for configuring generic parameters of the data forwarder elements such as Quality of Service (QoS), Security, and the like. The access agnostic interface would have mandatory parameters which may be specific for the specified radio access technology (RAT). Based on such a capability of the interface, the known wire-line and wireless technologies shall have the capability to interface with the NGxC 102. As NGxC 102 architecture is based on a Software Defined Network (SDN) principle, communication network 108 may not be equipped with the features of the protocols like S1 Application Protocol (S1AP). However, the communication network 108 may be implemented to include the features of the Network Attached Storage (NAS) protocols so as to be able to manage the context of a network node.

In operation, the NGxC 102 of the aforementioned wireless communication network 100 may receive one or more requests from the UE 104. The received request may be intended to access one or more services supported by the NGxC 102. Such one or more services may include, but are not limited to, such as, one or more function relating to Firewall (selectively block certain type of traffic, traffic coming from certain IP addresses), video optimization, Transfer Control Protocol (TCP) optimization, content caching, Packet Gateway (PGW) functions, Serving Gateway (SGW) functions, Deep Packet Inspection (DPI), web content filtering, parental controls, encryption, and the like.

Based on the received request, the NGxC 102 may determine a type of requested service and a feasibility of delivering the requested service at least based on an entitlement of the user and a capability of a network node for delivering the requested service. Based on the determination, the NGxC 102 may further perform an orchestration of services and one or more resources of the wireless communication network 100 for delivering the requested service.

In an embodiment, the NGxC 102 may perform the orchestration by determining an availability of the one or more resources of the wireless communication network 100 for delivering the requested service. In an embodiment, the one or more resources may correspond to one or more provisioned network nodes within or managed by the NGxC 102, or within NC 106. In the absence of the one or more provisioned network nodes, such as data forwarder access node, RAT access node, server nodes, and the like, the NGxC 102 may identify one or more network nodes based on the availability. Further, the NGxC 102 may provision the identified one or more network nodes with configuration settings required for delivering the service requested by the UE 104. Additionally, the NGxC 102 may further create one or more network nodes based on unavailability of at least a network node for the provisioning, Further, the dynamically created one or more network nodes may be provisioned with the configuration settings required for delivering the requested service.

Further, as will be appreciated by one skilled in the art, a variety of processes may be employed for transmitting data over a communication network. For example, the exemplary wireless communication network 100 may transmit data over a communication network by the processes discussed herein. In particular, as will be appreciated by those of ordinary skill in the art, control logic and/or automated routines for performing the techniques and steps described herein may be implemented by the wireless communication network 100, either by hardware, software, or combinations of hardware and software. For example, suitable code may be accessed and executed by the one or more processors on the wireless communication network 100 to perform some or all of the techniques described herein. Similarly, application specific integrated circuits (ASICs) configured to perform some or all of the processes described herein may be included in the one or more processors on the wireless communication network 100.

It will be further apparent to a person skilled in the art that for a wireless communication network other than 5G, network components and parameters associated with that wireless communication network 100 will be used. Also, the description below describes a 5G network for purposes of example, and 5G terminologies may be used in much of the description below. However, as stated above the techniques are applicable beyond 5G networks.

Referring now to FIG. 2, a block diagram for performing orchestration of services in a next generation mobile core (NGxC) network is illustrated, in accordance with an embodiment. FIG. 2 is explained in conjunction with elements from FIG. 1. With reference to FIG. 2, there is shown the NGxC 102. The NGxC 102 may include one or more hardware processors, such as a hardware processor 202, a memory 204, one or more NGxC sub-systems 206, an input/output (I/O) unit 208, and a transceiver 210.

The hardware processor 202 may include suitable logic, circuitry, interfaces, and/or code that may be configured to execute a set of instructions stored in the memory 204. The hardware processor 202 may be a single processor with multiple partitions or independent processors working in a group to perform the desired functionalities. To this end, hardware processor 202 may include a configuration handler module, and a radio resource management module (not shown in FIG. 2). Configuration handling module may manage overall configuration of the NGxC 102 and performs various functions that may include, but are not limited to, receiving configuration data from an Operation and Maintenance (OAM) module (not shown in FIG. 2) through an OAM interface and storing them in memory 204 at start up, bringing up the control subsystem, the data subsystem, the radio subsystem (not shown in FIG. 2) and configuring them using the configuration data. Configuration handling module may also receive reconfiguration data from the OAM module to a control subsystem, a data subsystem, and a radio subsystem. Additionally, the configuration handling module updates feedback, via the OAM interface, to the OAM module to enable it to perform any change in the configuration data. Radio resource management module may manage decision to efficiently run the NGxC 102 and interfaces with the OAM module through configuration handling module. Other functions of the radio resource management may include, but are not limited to Physical Cell Identity (PCI) self-configuration and self-optimization, Automatic Neighbor Relation (ANR) management, X2 link auto creation, cell outage detection, cell coverage optimization, and collecting live measurement metrics to send feedback to the OAM module about current network conditions.

In addition to the aforementioned components and features, the hardware processor 202 further includes an Access-Agnostic Interface set that includes access agnostic common parameter that will be used for different interface directions. The hardware processor 202 further includes a Policy Management set that includes one or more policies to be applied across multiple NGxC instances. The hardware processor 202 further includes an Instance capability and Reliability set. The hardware processor 202 further includes an Algorithm set that includes algorithm parameters keys to be applied for Admission control, QoS management. The hardware processor 202 further includes a QoS database set that includes different QoS policy enforcement rules and regulation to be applied in the data plane forwarding nodes.

The memory 204 may include suitable logic, circuitry, interfaces, and/or code that may be configured to store the data related to Authentication, Authorization and Accounting (AAA), policy data, and analytics data for management of the devices associated with the NGxC 102. The memory 204 may be further configured to store plurality of thresholds, such as a pre-defined time interval for which a provisioned network node is to be monitored, a pre-defined QoS threshold, and a tolerable limit for variation in the monitored QoS (QoS deviation threshold). In an implementation, the memory 204 may include a volatile memory and/or a non-volatile memory.

The NGxC subsystem 206 may include suitable logic, circuitry, interfaces, and/or code that may be configured to perform orchestration of services. The NGxC subsystem 206 may include a plurality of functional modules and each of the plurality of functional module map to the some aspects of overall NGxC functionality. The NGxC subsystem 206 may be further divided into mandatory and optional blocks. In an implementation, the NGxC subsystem 206 may include a control-plane (C-plane) controller 212, a user-plane (U-plane) controller 214, an operation interface-plane (OI-plane controller 216, and a network orchestration unit 218. The C-plane controller 212 may be configured to receive, interpret, and perform the function related to the control plane pertaining to one or more UE's associated with the NGxC 102. The U-plane controller 214 may be configured to receive, interpret, and perform the function related to the user plane messages pertaining to one or more UE's associated with the NGxC 102. The OI-plane controller 216 may be configured to receive, interpret, and perform the function related to the operation and maintenance pertaining to one or more UE's and the servicing network nodes associated with the NGxC 102. Such operations related to the maintenance of the servicing network nodes may include dynamically provisioning the requested service on the network nodes and creating/deleting/modifying the network nodes as per the requirements of the requested service. The network orchestrator 218 may be configured to perform orchestration of the network nodes of the NGxC 102 based on one or more service requests received from the one or more UEs associated with the NGxC 102. The network orchestrator 218, in conjunction with the memory 204, may be further configured to perform service provisioning, data forwarding, authentication, policy enforcement, and the like.

In an implementation, the NGxC subsystem 206 may further include NGxC Database (not shown) that may be implemented in conjunction with the memory 204. The NGxC Database may be configured to creates and manage database instances of NGxC 102 especially the subscriber preference set, Wireline capability set, Wireless capability set, 5G capability set, QoS database capability set, device capability set. Each of the database capability set stores the subscriber details, service details, QoS details, device details. During steady state operation of NGxC 102, the NGxC database capability set provides essential parameters for overall functionality of NGxC 102. Further, the NGxC subsystem 206 may include an NGxC data plane that creates a data plane instance and orchestrates an instance of the NGxC 102. The sub-components of the NGxC data plane may include a transport tunnel and/or QoS functional blocks.

The I/O unit 208 may include suitable logic, circuitry, interfaces, and/or code that may be configured to notifying the user upon the receipt of the request based on an acknowledgement message. The I/O unit 208 may generate one or more messages or data packets for performing the aforementioned notification. Such generated data packets may be transmitted to the UE (such as the requesting UE 104), via the transceiver 210.

The transceiver 210 may include suitable logic, circuitry, interfaces, and/or code that may be configured to communicate with the NC 106 and/or the UE 104, via a communication network 108. The transceiver 210 may implement known technologies to support wired or wireless communication. The transceiver 210 may include, but is not limited to, an antenna, a radio frequency (RF) transceiver, one or more amplifiers, a tuner, one or more oscillators, a digital signal processor, a coder-decoder (CODEC) chipset, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), Long Term Evolution (LTE), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the hardware processor 202 may be configured to receive a request from a user for accessing a service from a plurality of services supported by the NGxC subsystem 206. Upon the receipt of the request, the C-plane controller 212 of the NGxC subsystem 206 may be configured to authenticate the service request by use of the pre-configured AAA and the policy and charging enforcement function (PCEF) functionality into the NGxC subsystem 206. In an embodiment, the AAA and the PCEF may be present as dedicated components within the NGxC 102.

In an embodiment, the C-plane controller 212 may be configured to determine at least a type of requested service and a feasibility of delivering the requested service. The determination of the feasibility may be based on an entitlement of the user and a capability of a network node for delivering the requested service. The entitlement of the UE 104 may be determined based on the policy data stored (as PCEF) in the memory 204.

In an embodiment, when there are "n" number of users associated with the NGxC 102, the C-plane controller 212 may determine a service type-service request pair in the form of "n<SR(m), ST(k)>", where ST(k) denotes service type requested by a user "k" (from the set of "n" users) and SR(m) denotes the number of services "m" requested by the user "k". Such a service type-service request pair may be determined for each user from the set of "n" users and may be stored in the memory 204. In an embodiment, the I/O unit 208, in conjunction with the C-plane controller 212, may be configured to notifying the user of the UE 104, upon the receipt of the request based on an acknowledgement message.

The hardware processor 202, in conjunction with the network orchestrator 218 may be configured to perform an orchestration of services and one or more resources of the NGxC 102 for delivering the requested service. Performing such an orchestration may be predicated upon the determination of the aforementioned feasibility. The C-plane controller 212, in conjunction with the AAA stored in the memory 204, may be configured to categorize the received service request for provisioning using service orchestration. The U-plane controller 214 may be configured to identify one or more network nodes that can be provisioned using service orchestration based on the availability. In an embodiment, the resource availability may be based on the capability of the existing network node in core network. A particular service which cannot be provisioned by a network node may not be provided by the network. In an exemplary scenario, when the identification of the one or more network nodes is successful, the U-plane controller 214 may be configured to provision the identified one or more network nodes with configuration settings required for delivering the requested service.

In an exemplary scenario, the C-plane controller 212 may determine that one or more network nodes that can be provisioned using service orchestration may not be available. In such a scenario, the C-plane controller 212 may be configured to dynamically create one or more network nodes for the provisioning the requested service. In an embodiment, following the creation of the one or more network nodes, the U-plane controller 214 may be configured to provision the identified one or more network nodes with configuration settings required for delivering the requested service.

In an embodiment, the U-plane controller 214 may be configured to create a service instance for the provisioned service for providing the requested service to the user through a transport infrastructure. The U-plane controller 214 may be further configured to assign the created service instance to a network node selected from the one or more network nodes. In a scenario, when requested service is requested by a plurality of users, the U-plane controller 214 may be configured to determine one or more users from the plurality of users, to whom the service is to be delivered via the selected network node.

In an embodiment, the U-plane controller 214 may be further configured to monitor Quality of Service (QoS) of a service delivered by the selected network nodes. The U-plane controller 214 may be configured to calculate the required quality of service ($QoS_{Req}$) quality of the provisioned service. Such a required quality of service may be stored in the memory 204. Based on the monitoring, the U-plane controller 214 may be configured to determine a service quality ($QoS_{Rec}$) experienced by the user (or one or more users) to whom the requested service is delivered. The U-plane controller 214 may be further configured to store the $QoS_{Req}$ and $QoS_{Rec}$ in the memory 204.

In an embodiment, the network orchestrator 218 may be configured to determine a difference QoS ($QoS_{Diff}$) between the required quality of service ($QoS_{Req}$) and the monitored QoS ($QoS_{Rec}$), in accordance with the equation (1):

$$QoS_{Diff} = QoS_{Req} - QoS_{Rec} \tag{1}$$

The network orchestrator 218 may be configured to compare the difference QoS with a pre-defined QoS threshold ($QoS_{Th}$) stored in the memory 204 to determine whether to perform corrective actions, in accordance with the equation (2):

$$\text{If, } QoS_{Diff} \leq QoS_{Th} \tag{2}$$

perform corrective actions else, continue with service delivery

In an embodiment, the one or more corrective actions may include allocating one or more new resource to a network node, and creating a new network node. The aforementioned corrective actions may be performed by the OI-plane controller 216 in conjunction with the hardware processor 202.

In an embodiment, the delivery of the requested service may be controlled by the network orchestrator, in conjunction with the hardware processor 202, based on a successful authentication and authorization performed by a policy and charging enforcement function (PCEF) component of the NGxC 102, on the received request.

Additionally, the network orchestrator 218 may be configured to monitor the usage of the one or more created network nodes. In a scenario, when a network node from the created one or more network nodes is not used for service delivery for more than a pre-defined time interval, the network orchestrator 218 may be configured to deactivate the network node.

FIGS. 3A and 3B collectively depict a flow diagram of a detailed exemplary process for performing orchestration of services in a next generation mobile core (NGxC) network, in accordance with some embodiments of the present disclosure. With reference to FIGS. 3A and 3B, there is shown a flow chart 300. The flow chart 300 is described in conjunction with FIGS. 1 and 2. The process starts at step 302 and proceeds to step 304.

At step 304, a request from a user for accessing a service from a plurality of services supported by the NGxC network may be received by the NGxC 102. At step 306, at least a type of requested service and a feasibility of delivering the requested service at least based on an entitlement of the user and a capability of a network node for delivering the requested service may be determined by the NGxC 102.

At step 308, upon the receipt of the request a notification based on an acknowledgement message, may be transmitted to the user. At step 310, an availability of the one or more resources comprising at least one or more provisioned network nodes for delivering the requested service, may be determined. In instances, when the one or more network nodes are available, the control passed to step 312. In instances, when the one or more network nodes are not available, the control passed to step 314.

At step 312, one or more network nodes may be provisioned with configuration settings required for delivering the requested service. At step 314, one or more network nodes may be created by the NGxC 102. At step 316, the created one or more network nodes may be provisioned with configuration settings required for delivering the requested service.

At step 318, the service delivery may be initiated based on the provisioned one or more network nodes. At step 320, the one or more network nodes may be monitored to determine a difference between a pre-defined QoS requirement and the QoS experienced by the user. At step 322, the determined difference may be compared with a pre-defined QoS threshold. At step 324, when the determined difference is greater than the pre-defined QoS threshold based on the comparison. In instances, when the determined difference is greater than the pre-defined QoS threshold, the control passes to step 320. At step 326, when the determined difference is greater than the pre-defined QoS threshold, one or more corrective actions may be performed by the NGxC 102 to control the quality of the delivered service. The control passes to end step 328.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing this technology. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing this technology. When implemented on a general-purpose microprocessor, the computer program code segments configure the microprocessor to create specific logic circuits.

FIG. 4 is a block diagram of an exemplary computer system for implementing various embodiments. Computer system 402 may include a central processing unit ("CPU" or "processor") 404. Processor 404 may include at least one data processor for executing program components for executing user or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 404 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 404 may be disposed in communication with one or more input/output (I/O) devices via an I/O interface 406. I/O interface 406 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 406, computer system 402 may communicate with one or more I/O devices. For example, an input device 408 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 410 may be a printer, fax machine, video display (e.g., cathode ray tube (CRT), liquid crystal display (LCD), light-emitting diode (LED), plasma, or the like), audio speaker, etc. In some embodiments, a transceiver 412 may be disposed in connection with processor 404. Transceiver 412 may facilitate various types of wireless transmission or reception. For example, transceiver 412 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 404 may be disposed in communication with a communication network 414 via a network interface 416. Network interface 416 may communicate with communication network 414. Network interface 416 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 414 may include, without limitation, a direct interconnection, local area network (LAN), wide area network (WAN), wireless network (e.g., using Wireless Application Protocol), the Internet, etc. Using network interface 416 and communication network 414, computer system 402 may communicate with devices 418, 420, and 422. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 402 may itself embody one or more of these devices.

In some embodiments, processor 404 may be disposed in communication with one or more memory devices (e.g., RAM 426, ROM 428, etc.) via a storage interface 424. Storage interface 424 may connect to memory 430 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 430 may store a collection of program or database components, including, without limitation, an operating system 432, a user interface 434, a web browser 436, a mail server 438, a mail client 440, a user/application data 442 (e.g., any data variables or data records discussed in this disclosure), etc. Operating system 432 may facilitate resource management and operation of the computer system 402. Examples of operating system 432 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 434 may facilitate display, execution, interaction, manipulation, or operation of program components through textual or graphical facilities. For example, user interfaces may provide computer interaction interface elements on a display system operatively connected to computer system 402, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, computer system 402 may implement web browser 436 stored program components. Web browser 436 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 402 may implement mail server 438 stored program components. Mail server 438 may be an Internet mail server such as Microsoft Exchange, or the like. The mail server may utilize facilities such as ASP, ActiveX, ANSI C++/C #, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 402 may implement mail client 440 stored program components. Mail client 440 may be a mail viewing application, such as Apple Mail, Microsoft Entourage, Microsoft Outlook, Mozilla Thunderbird, etc.

In some embodiments, computer system 402 may store user/application data 442, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of this technology with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments disclose methods and systems for performing orchestration of services in a next generation mobile core (NGxC) network. The method and system enable dynamic network node creation when the existing nodes are not able to provide the required service to the user or the existing nodes capacity is full. The method further enables dynamic destruction of the nodes when a node is inactive and does not provide service to the user, thereby leading to network resource conservation. The method further enables guaranteed service delivery as the dynamic node creation and destruction is not possible.

The specification has described methods and systems for neighbor relation management in wireless broadband networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of orchestrating services in Next Generation mobile Core (NGxC) networks, the method implemented by one or more NGxC controller devices and comprising:
   receiving, by a NGxC controller device, a request for accessing a service from a plurality of services supported by an NGxC network;
   determining, by the NGxC controller device, upon receipt of the request, at least a feasibility of delivering the requested service at least based on an entitlement of a user and a capability of a network node for delivering the requested service, wherein the capability of the network node is determined based on an availability of one or more resources, comprising at least one provisioned network nodes or another network node for provisioning, for delivering the requested service, wherein if the one or more resources are unavailable then one or more network nodes are dynamically created;
   performing, by the NGxC controller device, an orchestration of services and the one or more resources of the NGxC network for delivering the requested service, based on the determined feasibility;
   monitoring, by the NGxC controller device, a Quality of Service (QoS) of one or more of the services delivered by the provisioned one or more network nodes; and
   deactivating, by the NGxC controller device, a network node from the created one or more network nodes when the network node is not used for pre-defined time interval.

2. The method of claim 1, wherein the requested service is delivered based on a successful authentication and authorization performed by a policy and charging enforcement function (PCEF) component of the NGxC network on the received request and the NGxC network is one of a 5G core network or an advanced Long Term Evolution (LTE) core network.

3. The method of claim 1, further comprising, for delivering the requested service, in the absence of the one or more provisioned network nodes, identifying one or more network nodes based on the availability; and provisioning the identified one or more network nodes with one or more configuration settings required for delivering the requested service.

4. The method of claim 1, wherein the dynamically created one or more network nodes are provisioned with the configuration settings required for delivering the requested service.

5. The method of claim 1, further comprising determining a deviation in the monitored QoS with respect to a pre-defined QoS threshold, wherein one or more corrective actions are performed when the determined deviation exceeds the pre-defined threshold and the one or more corrective actions comprise allocating one or more new resources to a network node or creating a new network node.

6. A Next Generation mobile Core (NGxC) controller device comprising memory comprising programmed instructions stored thereon and a processor configured to be capable of executing the stored programmed instructions to:
   receive a request for accessing a service from a plurality of services supported by an NGxC network;
   determine, upon receipt of the request, at least a feasibility of delivering the requested service at least based on an entitlement of a user and a capability of a network node for delivering the requested service, wherein the capability of the network node is determined based on an availability of one or more resources, comprising at least one provisioned network nodes or another network node for provisioning, for delivering the requested service, wherein if the one or more resources are unavailable then one or more network nodes are dynamically created;
   perform an orchestration of services and the one or more resources of the NGxC network for delivering the requested service, based on the determined feasibility;
   monitor a Quality of Service (QoS) of one or more of the services delivered by the provisioned one or more network nodes; and
   deactivate a network node from the created one or more network nodes when the network node is not used for a pre-defined time interval.

7. The NGxC controller device of claim 6, wherein the requested service is delivered based on a successful authentication and authorization performed by a policy and charging enforcement function (PCEF) component of the NGxC network on the received request and the NGxC network is one of a 5G core network or an advanced Long Term Evolution (LTE) core network.

8. The NGxC controller device of claim 6, wherein the processor is further configured to be capable of executing the stored programmed instructions, for delivering the requested service, in the absence of the one or more provisioned network nodes, identify one or more network nodes based on the availability; and provision the identified one or more network nodes with one or more configuration settings required for delivering the requested service.

9. The NGxC controller device of claim 6, wherein the dynamically created one or more network nodes are provisioned with the configuration settings required for delivering the requested service.

10. The NGxC controller device of claim 6, wherein the processor is further configured to be capable of executing the stored programmed instructions to determine a deviation in the monitored QoS with respect to a pre-defined QoS threshold, wherein one or more corrective actions are performed when the determined deviation exceeds the pre-defined threshold and the one or more corrective actions comprise allocating one or more new resources to a network node or creating a new network node.

11. A non-transitory computer readable medium having stored thereon instructions for orchestrating services in Next Generation mobile Core (NGxC) networks comprising executable code which when executed by one or more processors, causes the processors to:

receive a request for accessing a service from a plurality of services supported by an NGxC network;

determine, upon receipt of the request, at least a feasibility of delivering the requested service at least based on an entitlement of a user and a capability of a network node for delivering the requested service, wherein the capability of the network node is determined based on an availability of one or more resources, comprising at least one provisioned network nodes or another, network node for provisioning, for delivering the requested service, wherein if the one or more resources are unavailable then one or more network nodes are dynamically created;

perform an orchestration of services and the one or more resources of the NGxC network for delivering the requested service, based on the determined feasibility;

monitor a Quality of Service (QoS) of one or more of the services delivered by the provisioned one or more network nodes; and deactivate a network node from the created one or more network nodes when the network node is not used for a pre-defined time interval.

12. The non-transitory computer readable medium of claim 11, wherein the requested service is delivered based on a successful authentication and authorization performed by a policy and charging enforcement function (PCEF) component of the NGxC network on the received request and the NGxC network is one of a 5G core network or an advanced Long Term Evolution (LTE) core network.

13. The non-transitory computer readable medium of claim 11, wherein the executable code when executed by the processors further causes the processors to, for delivering the requested service, in the absence of the one or more provisioned network nodes identify one or more network nodes based on the availability; and provision the identified one or more network nodes with one or more configuration settings required for delivering the requested service.

14. The non-transitory computer readable medium of claim 11, wherein the dynamically created one or more network nodes are provisioned with the configuration settings required for delivering the requested service.

15. The non-transitory computer readable medium of claim 11, wherein the executable code when executed by the processors further causes the processors to determine a deviation in the monitored QoS with respect to a pre-defined QoS threshold, wherein one or more corrective actions are performed when the determined deviation exceeds the pre-defined threshold and the one or more corrective actions comprise allocating one or more new resources to a network node or creating a new network node.

* * * * *